(12) United States Patent
Suh

(10) Patent No.: US 10,448,619 B2
(45) Date of Patent: Oct. 22, 2019

(54) EGG GRASP DEVICE HAVING INTERLACED MEMBERS, AND ASSOCIATED SYSTEMS AND METHODS

(71) Applicant: Zoetis Services LLC, Parsippany, NJ (US)

(72) Inventor: William Dongwook Suh, Cary, NC (US)

(73) Assignee: Zoetis Services LLC, Parsippany, NJ (US)

( * ) Notice: Subject to any disclaimer, the term of this patent is extended or adjusted under 35 U.S.C. 154(b) by 0 days.

(21) Appl. No.: 15/900,927

(22) Filed: Feb. 21, 2018

(65) Prior Publication Data

US 2018/0235187 A1    Aug. 23, 2018

Related U.S. Application Data

(60) Provisional application No. 62/461,855, filed on Feb. 22, 2017.

(51) Int. Cl.
*A01K 45/00* (2006.01)
*B65G 47/86* (2006.01)
(Continued)

(52) U.S. Cl.
CPC ............ *A01K 45/005* (2013.01); *A01K 43/00* (2013.01); *B25J 15/00* (2013.01); *B65G 47/847* (2013.01);
(Continued)

(58) Field of Classification Search
CPC ...... B25J 15/12; A01K 31/165; B65G 47/847; B65G 47/907
(Continued)

(56) References Cited

U.S. PATENT DOCUMENTS 1,500,939 A * 7/1924 Howell ................... B65B 23/08
294/87.12
1,995,619 A * 3/1935 Minto ..................... A47J 29/06
294/106
(Continued)

FOREIGN PATENT DOCUMENTS

WO    WO 2006/088362 A2    8/2006
WO    WO 2015/120230 A1    8/2015

OTHER PUBLICATIONS

PCT Search Report, International Application No. PCT/US2018/018937, International Filing Date Feb. 21, 2018, dated Apr. 30, 2018.
(Continued)

*Primary Examiner* — Jonathan Snelting
(74) *Attorney, Agent, or Firm* — Scott C. Mayhew

(57) ABSTRACT

An egg grasp device is provided. Such a device includes a body and a plurality of elongated members extending from the body. The elongated members are interlaced to form a sheath capable of retaining an egg. The sheath has a distal end and a proximal end at which the elongated members are operably engaged with the body. The elongated members cooperate to define an opening at the distal end through which an egg is received when the elongated members engage and deflect about an egg such that the egg is seated within the sheath. Associated systems and methods are also provided.

11 Claims, 11 Drawing Sheets

(51) Int. Cl.
  *B65G 47/90* (2006.01)
  *B25J 15/00* (2006.01)
  *A01K 43/00* (2006.01)
  *A01K 41/00* (2006.01)
  *A01K 43/04* (2006.01)
(52) U.S. Cl.
  CPC ............ *B65G 47/907* (2013.01); *A01K 41/00* (2013.01); *A01K 43/005* (2013.01); *A01K 43/04* (2013.01); *A01K 45/007* (2013.01)
(58) Field of Classification Search
  USPC .......................................... 294/19.2; 414/626
  See application file for complete search history.

(56) References Cited

U.S. PATENT DOCUMENTS

| | | | | |
|---|---|---|---|---|
| 2,666,665 A * | 1/1954 | Whitcher | ............... | A23B 5/065 |
| | | | | 294/87.12 |
| 2,736,157 A * | 2/1956 | Weathersby | ........... | A01D 11/02 |
| | | | | 294/19.2 |
| 2,749,697 A * | 6/1956 | Poche | .................... | A01D 11/00 |
| | | | | 294/19.2 |
| 4,006,581 A | 2/1977 | Freeman | | |
| 4,974,894 A * | 12/1990 | Dubow | .................. | A63B 47/02 |
| | | | | 294/19.2 |
| 5,326,145 A * | 7/1994 | Lee | ........................ | A63B 47/02 |
| | | | | 294/19.2 |
| 5,738,400 A * | 4/1998 | Chambless | .......... | A01K 31/165 |
| | | | | 294/179 |
| 5,924,175 A * | 7/1999 | Lippitt | ................. | A61B 17/221 |
| | | | | 24/537 |
| 2015/0225208 A1* | 8/2015 | Suh | ........................ | B65G 65/00 |
| | | | | 414/811 |

OTHER PUBLICATIONS

PCT Written Opinion, International Application No. PCT/US2018/018937, International Filing Date Feb. 21, 2018, dated Apr. 30, 2018.

* cited by examiner

EGG GRASP DEVICE HAVING INTERLACED MEMBERS, AND ASSOCIATED SYSTEMS AND METHODS

CROSS REFERENCE TO RELATED APPLICATION

This application claims the benefit of U.S. Provisional Patent Application No. 62/461,855, filed Feb. 22, 2017, which is expressly incorporated herein by reference in its entirety.

TECHNICAL FIELD

The present disclosure generally relates to egg processing devices. More particularly, the present disclosure relates to an egg grasp device capable of providing flexibility to grasp eggs of various shapes, sizes, and orientations, and associated systems and methods.

BACKGROUND

Various mechanical egg processing systems may be used to process avian eggs within a poultry hatchery facility or other egg processing facility (e.g., table eggs). In a hatchery, such mechanical egg processing systems may include, for example, a transfer system for transferring eggs from a tray associated with a setter incubator (commonly referred to as a "flat") to a container associated with a hatcher incubator (commonly referred to as a "hatching basket"). In other instances, an example of such mechanical egg processing systems may include an egg removal system for removing certain eggs from the flats. In the case of egg removal systems, it is common practice to remove non-live eggs from live eggs to increase available incubator space, to reduce the risk of contamination, and to save vaccine costs related to in ovo inoculations. In a facility processing table eggs, the eggs may be mechanically or manually moved for a variety of reasons.

In a hatchery, eggs designated as non-live may be removed by hand or via an automated egg removal device. Such egg removal device may employ mechanical means that can crack eggs during engagement therewith. In other instances, automated egg removal devices may employ suction-type lifting devices employing vacuum systems that require additional mechanisms and power requirements to function. Furthermore, such suction-type lifting devices may be difficult to maintain and clean, particularly after engaging a non-viable egg (infertile or containing a dead embryo) that explodes due to bacterial build-up within the egg. Additionally, the polymer-based suction cup may become deformed about the lip area after continuous use, thereby affecting the suction and lifting ability of the lifting device. In addition, the suction-type lifting devices do not straighten eggs oriented at an angle in the egg flat.

Accordingly, it would be desirable to provide an egg grasp device and associated system capable of capturing eggs in a simplified manner and having the flexibility to account for eggs of various shapes, sizes, and orientations, and further optionally providing the additional function of straightening eggs oriented off-axis. Furthermore, it would be desirable to provide an associated method that would simplify and facilitate improved securement of eggs.

BRIEF SUMMARY

The above and other needs are met by aspects of the present disclosure which, according to one aspect, provides an egg grasp device having a body and a plurality of elongated members extending from the body. The elongated members are interlaced to form a sheath capable of retaining an egg. The elongated members cooperate to define an opening through which an egg is received when the elongated members engage and deflect about an egg such that the egg is seated within the sheath.

Another aspect provides an egg processing system having a head configured to ascend and descend. A plurality of egg grasp devices is operably engaged with the head. Each egg grasp device has a plurality of elongated members interlaced to form a sheath capable of retaining the egg. The elongated members cooperate to define an opening through which the egg is received when the elongated members engage and deflect about an egg such that the egg is seated within the sheath.

Yet another aspect provides a method of securing eggs. The method comprises descending an egg grasp device to interact with an egg, the egg grasp device having a plurality of elongated members interlaced to form a sheath capable of retaining the egg, and the elongated members cooperating to define an opening through which the egg is received. The method further comprises contacting the sheath with the egg at the opening. The method further comprises seating the egg within the sheath by deflecting elongated members about the egg. The method further comprises ascending the egg grasp device. According to one aspect, the method further comprises releasing the egg from the sheath by actuating a release device.

Still another aspect provides an egg removal system having a rotatable drum assembly. The egg transport system further includes a plurality of egg grasp devices operably engaged with the rotatable drum assembly. Each egg grasp device has a plurality of elongated members interlaced to form a sheath capable of retaining the egg. The elongated members cooperate to define an opening through which the egg is received when the elongated members engage and deflect about an egg such that the egg is seated within the sheath.

Thus, various aspects of the present disclosure provide advantages, as otherwise detailed herein.

BRIEF DESCRIPTION OF THE DRAWINGS

Figure 1:
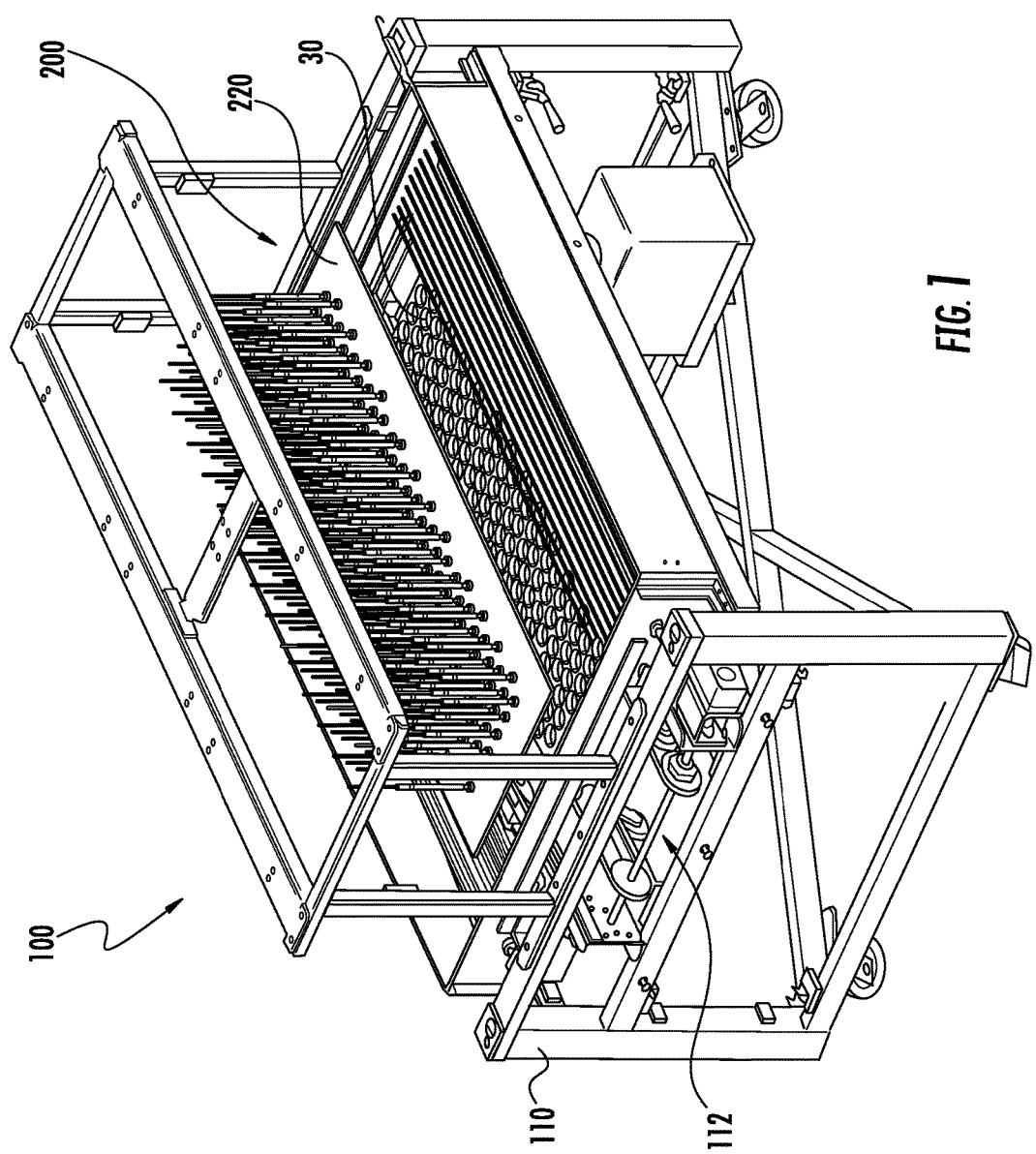
Figure 2:
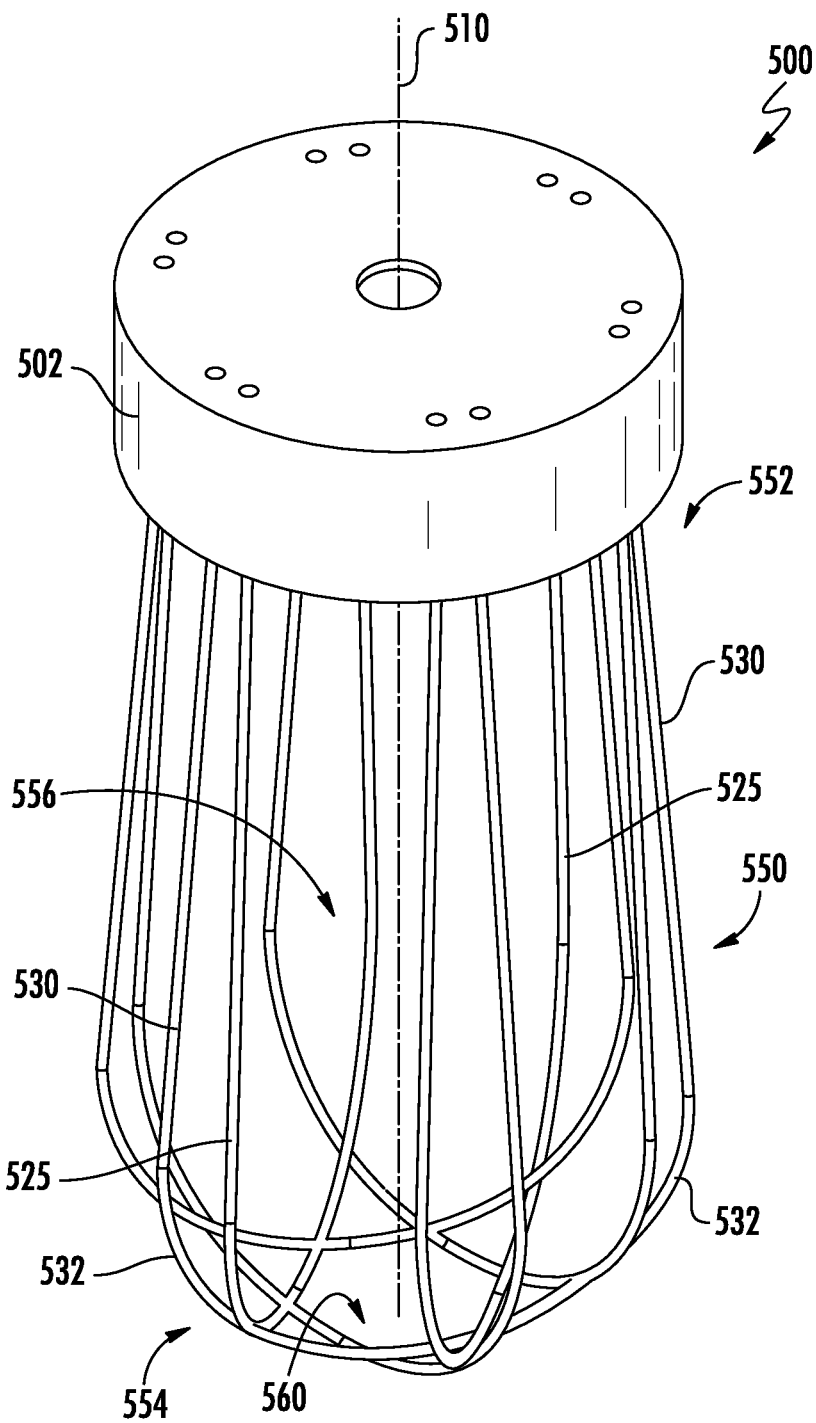
Figure 3:
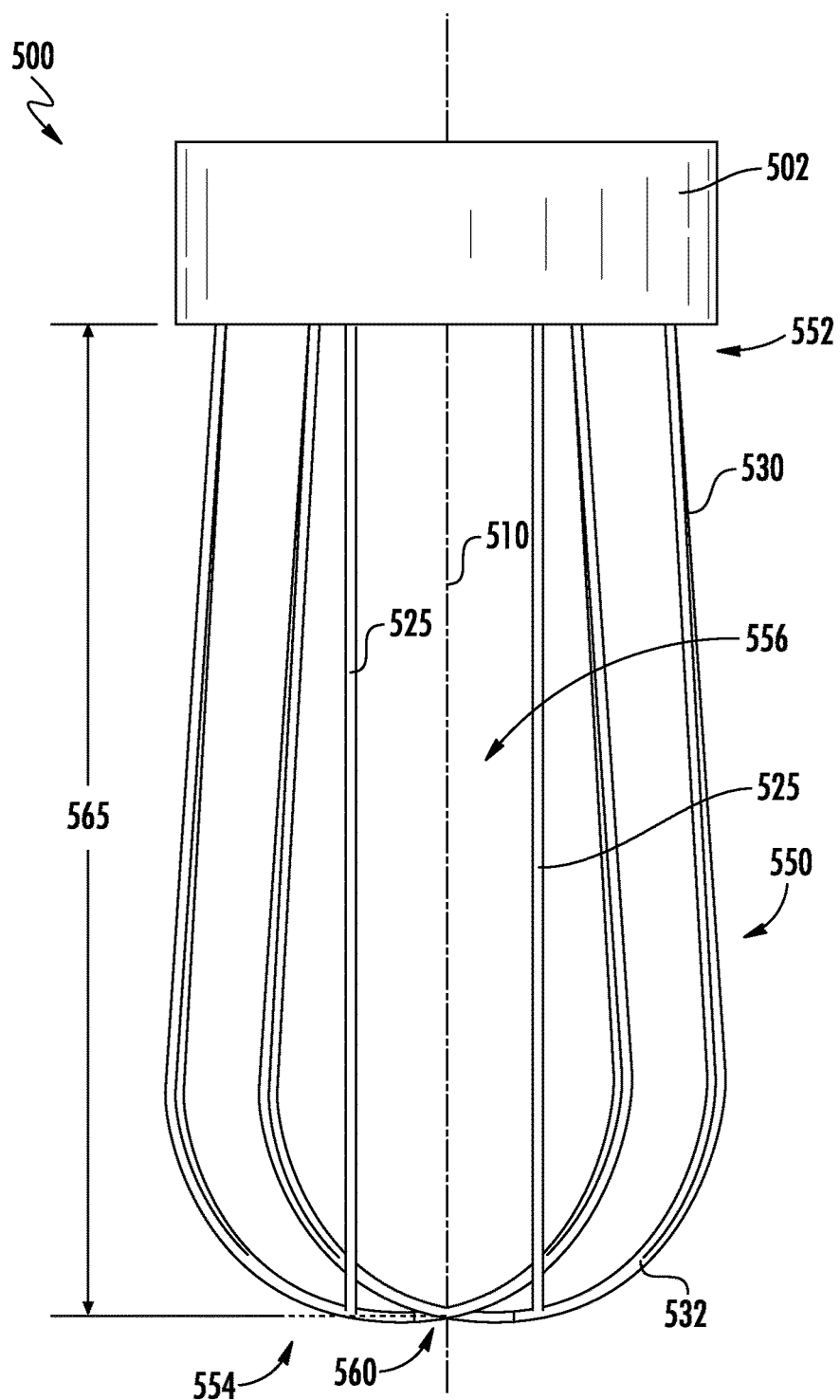
Figure 4:
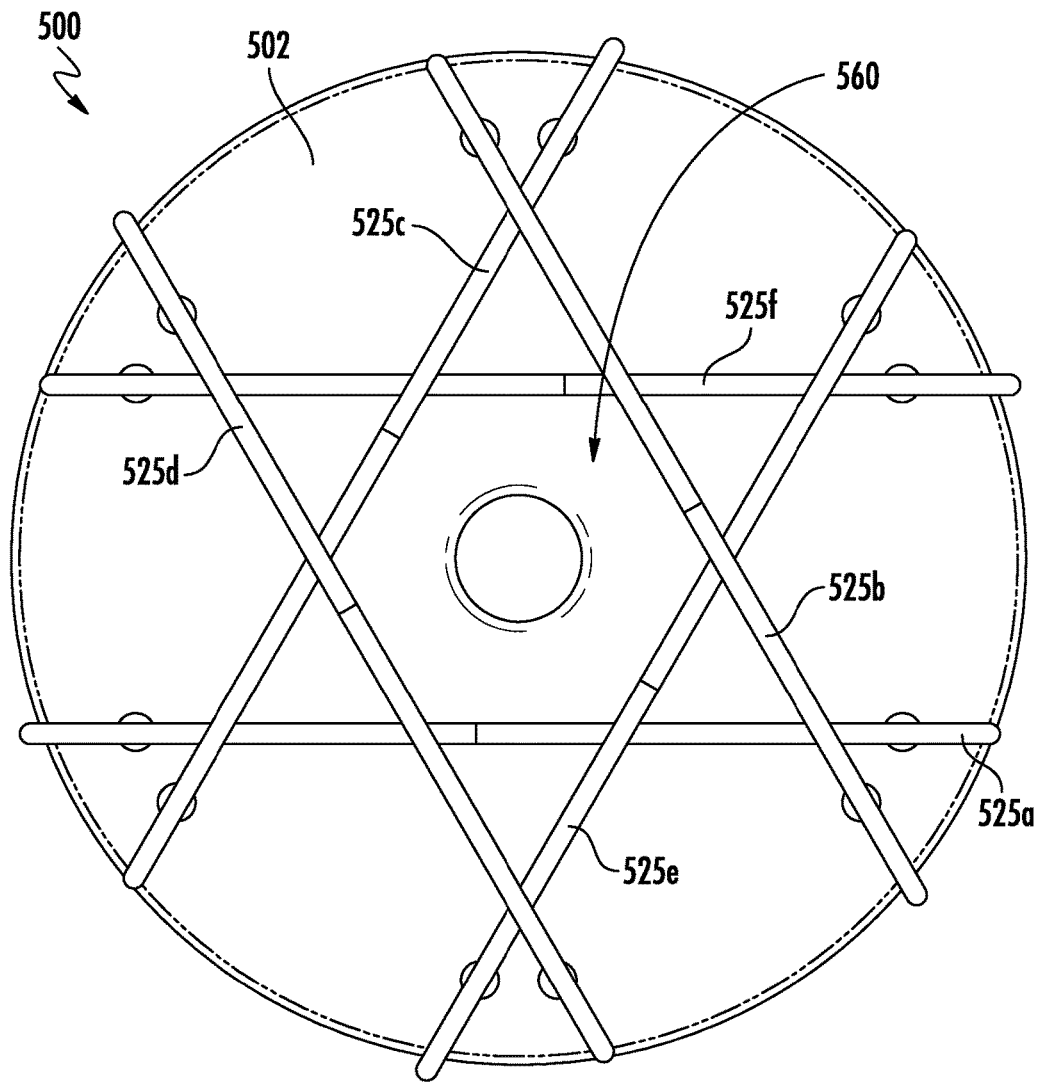
Figure 5:
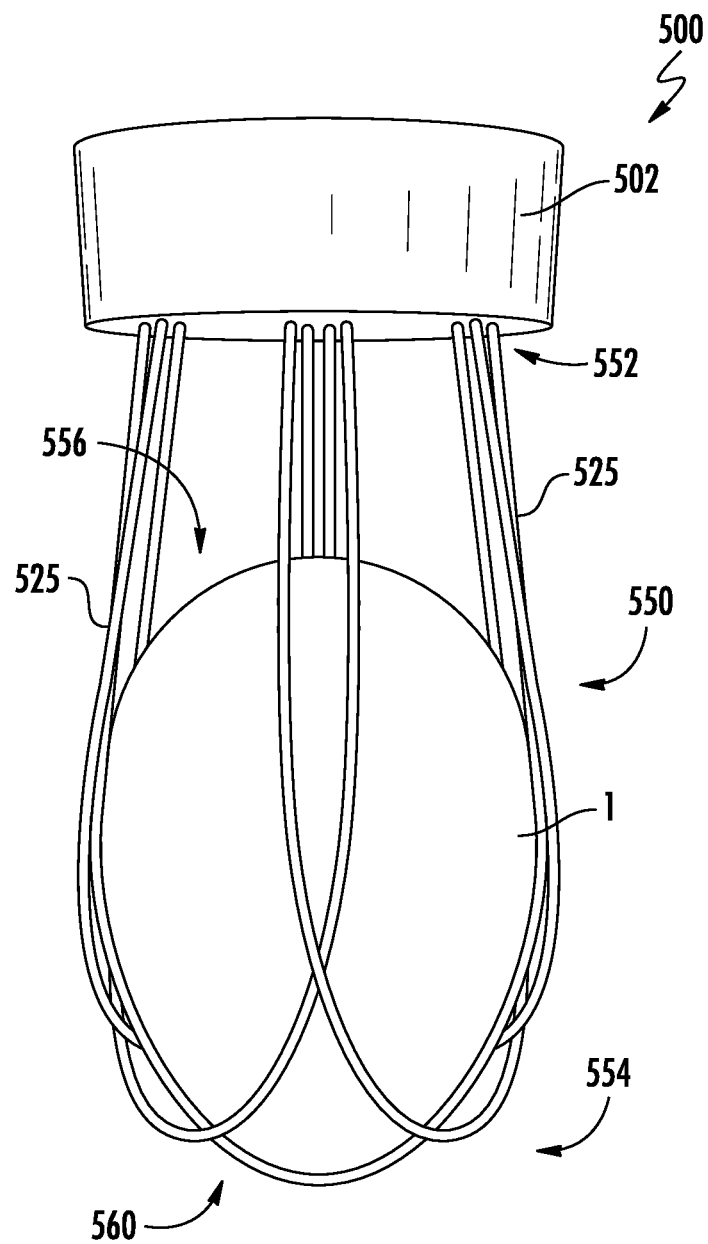
Figure 6:
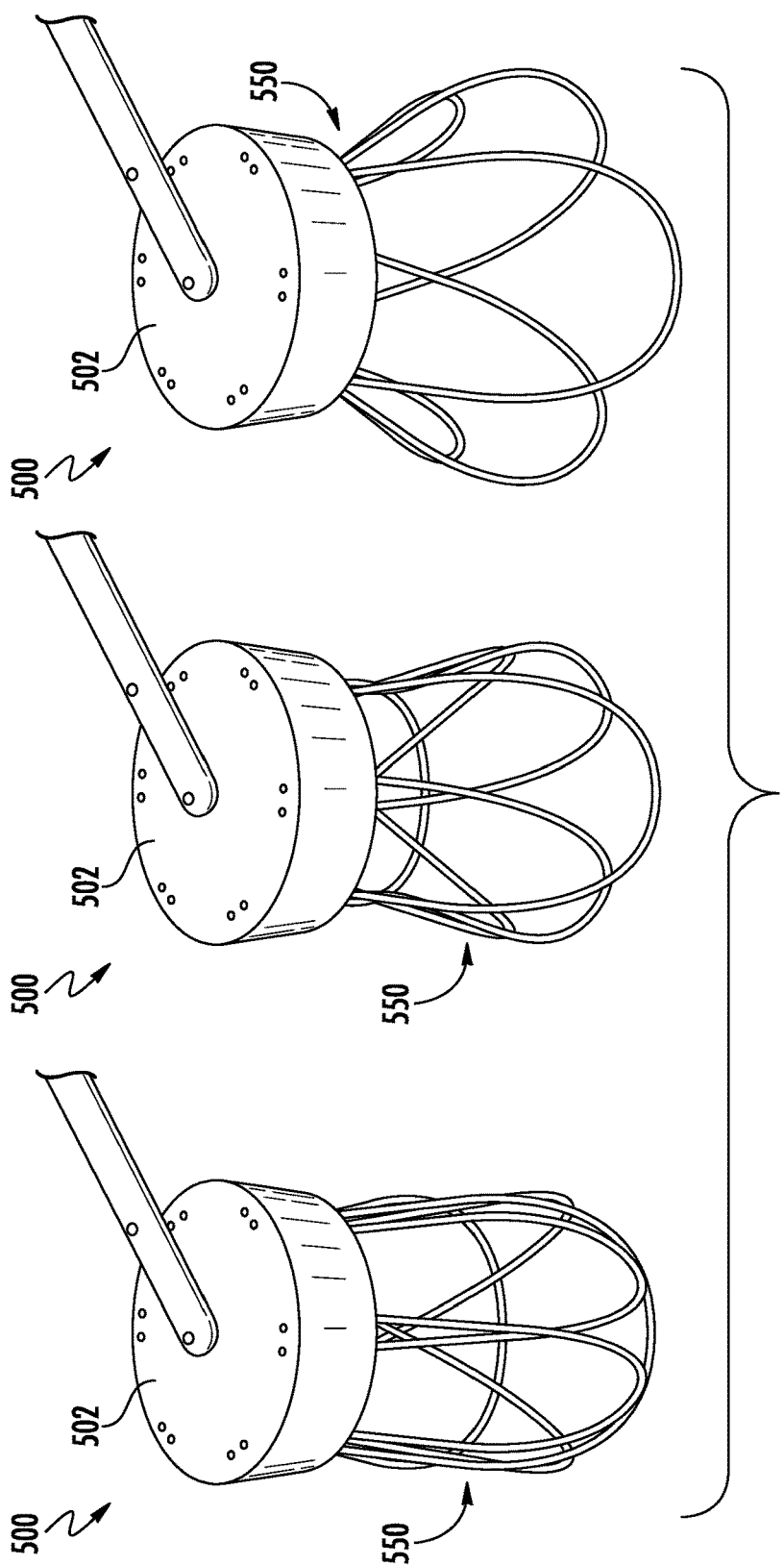
Figure 7:
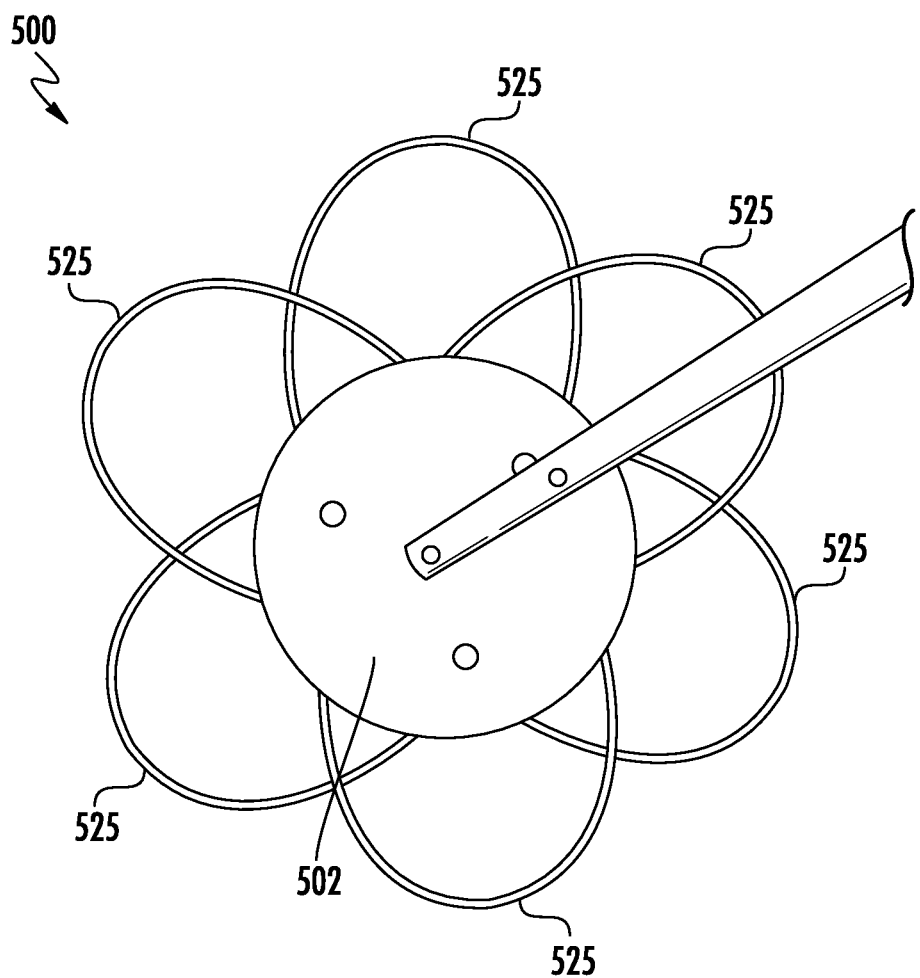
Figure 8:
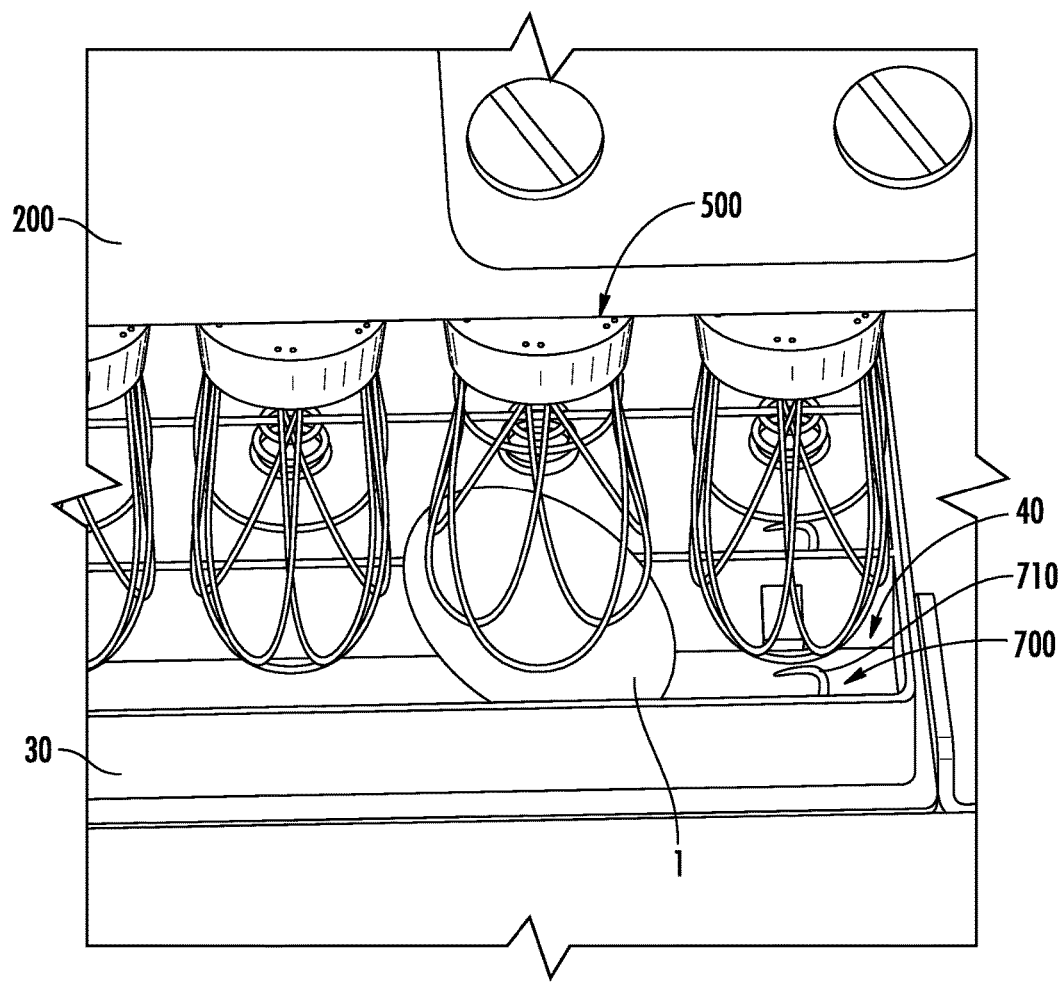
Figure 9:
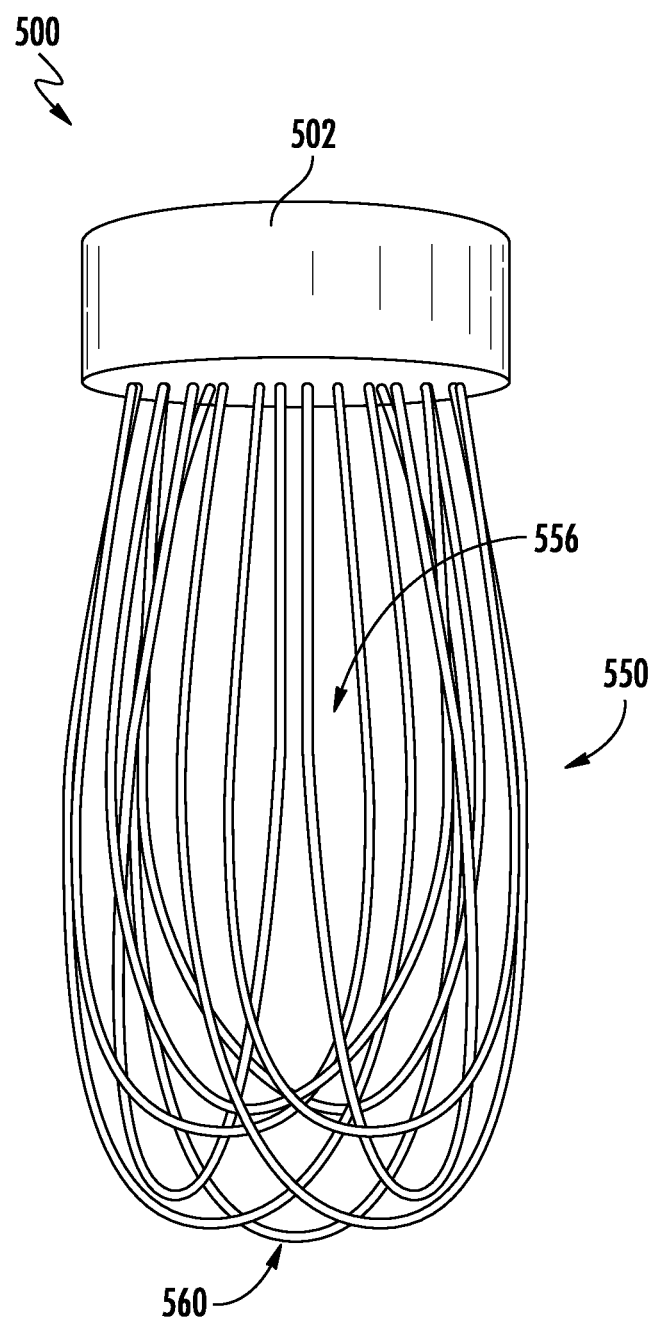
Figure 10:
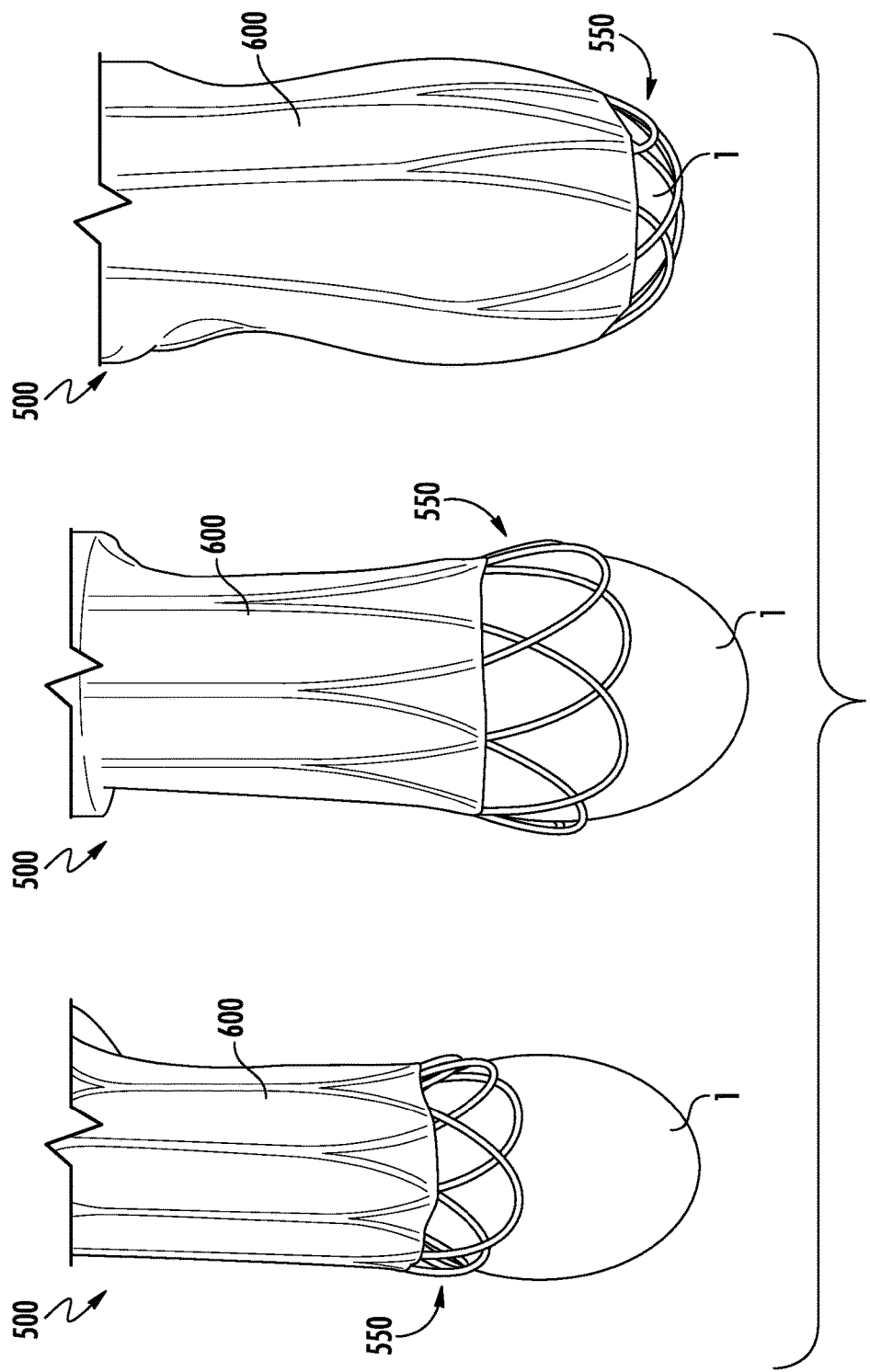
Figure 11:
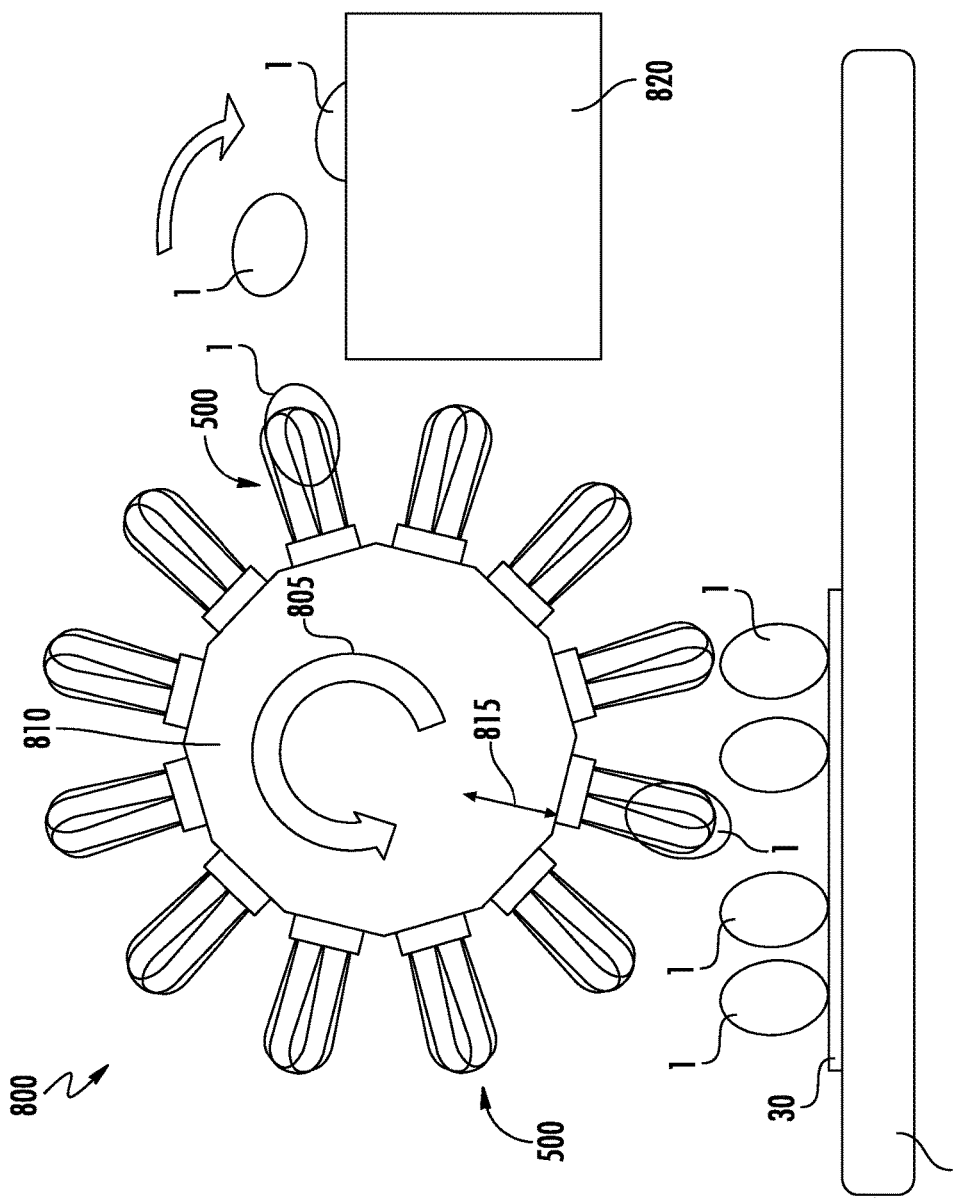

Having thus described various embodiments of the present disclosure in general terms, reference will now be made to the accompanying drawings, which are not necessarily drawn to scale, and wherein:

FIG. 1 is a perspective schematic view of an egg processing system capable of implementing a plurality of egg grasp devices, according to one aspect of the present disclosure;

FIG. 2 is a perspective schematic view of an egg grasp device, according to one aspect of the present disclosure;

FIG. 3 is a side schematic view of the egg grasp device shown in FIG. 2;

FIG. 4 is a bottom schematic view of the egg grasp device shown in FIG. 2;

FIG. 5 is a side view of the egg grasp device shown in FIG. 2, with an egg seated within the egg grasp device;

FIG. 6 illustrates a deflection sequence of an egg grasp device in which a plurality of elongated members are capable of deflecting outward to accommodate eggs of various sizes, shapes and orientations, according to one aspect of the present disclosure;

FIG. 7 is a top view of an egg grasp device having a plurality of deflectable elongated members, illustrating a formed flower pattern when the elongated members are deflected outward;

FIG. 8 is a perspective view of an egg grasp device engaging an egg at a tilted orientation within an egg flat;

FIG. 9 is a side view of an egg grasp device having a plurality of elongated members, according to another aspect of the present disclosure;

FIG. 10 illustrates an egg seating sequence in which an egg grasp device having a shroud seats an egg, according to one aspect of the present disclosure; and FIG. 11 is a schematic view of an egg removal system having a rotatable drum assembly and egg grasp devices affixed thereto, according to one aspect of the present disclosure.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

The present disclosure is directed to devices, systems and methods configured to grasp eggs for subjecting the eggs to various processes. According to some aspects, the present disclosure provides vacuumless/suctionless means for grasping and transporting eggs. The terms vacuumless/suctionless refer to the lack of vacuum or suction needed to interact with an egg in order to secure said egg for transport. Instead, aspects of the present disclosure provide physical engagement means for capturing an egg. Such vacuumless/suctionless aspects of the present disclosure provide many advantages, including simplifying the means for securing eggs, improving ease of maintenance, improving reliability, and improving adaptability to grasp eggs of various sizes, shapes, and orientations. In this regard, the problem to be solved relates to seeking gentler mechanical handling of eggs, particularly with respect to those containing live embryos, in which the risks of cracking are reduced by providing a solution in which adaptability is provided for capturing eggs of various shapes and sizes and positioned at various orientations.

FIG. 1 illustrates an automated egg processing system 100. According to the particular aspect shown in FIG. 1, the egg processing system 100 is capable of removing and/or transferring eggs. Aspects of the present disclosure, however, are not limited to the illustrated egg processing system 100 of FIG. 1. Aspects of the present disclosure may be implemented on any system or apparatus in which securement of eggs is desired. For example, aspects of the present disclosure may be implemented on an egg transfer system used to transfer eggs from a setter incubator tray (a so-called "egg flat") to a hatch incubator tray (a so-called "hatching basket").

As shown in FIG. 1, the egg processing system 100 may be particularly adapted for removing eggs positioned within an egg flat, which includes a plurality of receptacles for individually receiving and maintaining eggs in a generally vertical orientation, although the eggs may often be tilted to varying degrees within the individual receptacles. Examples of suitable commercial flats include, but are not limited to, a "CHICKMASTER 54" flat, a "JAMESWAY 42" flat and a "JAMESWAY 84" flat (in each case, the number indicates the number of eggs carried by the egg flat). Using the egg processing system 100, all or selected eggs may be removed from an egg flat when positioned below an egg processing head 200.

According to some aspects, the egg processing system 100 may include a frame 110 and a conveyor assembly 112 provided to move egg flats in an automated manner through the egg processing system 100 to a removal position. The conveyor assembly 112 may include a guide rail system configured to receive and guide egg flats to the removal position. The conveyor assembly 112 may further include appropriate stop elements, sensors, belts, endless loops, motors, etc. for proper indexing and positioning of egg flats within the egg processing system 100. In some instances, egg flats may be manually advanced through the egg processing system 100.

Eggs entering the egg processing system 100 via egg flats may have varying classification characteristics. For example, egg flats may include eggs that are classifiable based on viability, pathogen content, genetic analysis, or combinations thereof. As such, eggs are passed through an egg classifier system to generate a classification for each egg contained in an egg flat. Such eggs may be classified as viable or non-viable (i.e., those eggs not containing a viable embryo according to the egg classifier system), wherein the non-viable eggs may be further sub-classified as, for example, infertile, rotten, or dead eggs. Exemplary egg classifier systems may be capable of classifying the eggs by using, for example, candling techniques (opacity, infrared, NIR, etc.), assaying techniques, or other known and suitable classification methods, processes, or techniques. After classification, the eggs may be removed accordingly from the egg flat using the egg processing system 100 according to the identified classification, such as, for example, removing non-viable eggs from the egg flat.

As shown in FIG. 1, the egg processing system 100 may include the egg processing head 200 coupled to the frame 110. According to aspects of the present disclosure, the egg remover head 200 may include a plurality of egg grasp devices 500, as shown in FIGS. 2-5, capable of selectively or non-selectively seizing eggs from the egg flat. In some instances, the egg processing head 200 may include a plate 220 to which the egg grasp devices 500 are secured, coupled, or otherwise engaged. According to some aspects, the plate 220 may define a plurality of holes for receiving the egg grasp devices 500. In some instances, the egg grasp devices 500 may be selectively or individually controlled. That is, the egg grasp devices 500 may be selectively deployed such that interaction thereof with respective eggs may be selectively controlled. For example, the egg grasp device 500 may be configured to selectively engaging respective eggs such that only those eggs identified as a first subset (e.g., as live or viable) of eggs are contacted for removal or transfer from the egg flat. In such instances, a second subset (e.g., non-live or non-viable) of eggs may remain in the egg flat for further processing without contact from any of the egg grasp devices 500.

According to some aspects, the conveyor assembly 112 may transport eggs stored in the egg flat past the egg classifier system so that each egg passes therethrough such that data (egg classification status) may be generated for each egg. The data collected by the egg classifier system may be provided to a controller for processing and storing data associated with each egg. The controller may then be capable of generating a selectable removal signal to send to the egg grasp devices 500 so that individual egg grasp devices 500 (or subsets of egg grasp devices 500) are separately and individually deployed at various positions according to the classification status for each egg based on the data collected by the egg classifier system.

In other instances, the egg processing apparatus 100 may include the egg processing head 200 coupled to the frame 110 and configured to move vertically for interacting with eggs contained within an egg flat when in a removal position beneath the egg processing head 200. The egg processing head 200 may be pneumatically or electrically driven to move vertically for facilitating interaction with eggs in the egg flat. In some instances, the egg processing head 200 may be lowered and raised pneumatically using a transfer cylinder (not shown) in fluid communication with a pneumatic system, as known by those of skill in the art. In some instances, the egg processing head 200 may be capable of lateral or horizontal movement outside the conveyor assembly 112 and/or the removal position.

In other instances, the egg processing head 200 may be capable of arcuate movement using, for example, a servo motor. In such instances where the egg processing head 200 is movable, the egg grasp devices 500 may be fixed to the egg processing head 200 such that the egg grasp devices 500 are not individually or separately deployed for engaging the eggs. Instead, all eggs in the egg flat would be engaged by the various egg grasp devices 500 moved by the egg processing head 200. However, when the egg grasp devices 500 are individually or selectively controlled, the egg processing head 200 may still be capable of movement for various reasons, including transporting the eggs removed from the egg flat to some other location. In some instances, the egg grasp devices 500 may be positioned on a head attached to a frame of a robotic system having an articulating robotic arm. The robotic system may have a guidance system configured to position the egg grasp devices 500 proximate to the egg for engagement therewith.

As shown in FIG. 8, the egg processing system 100 may be configured to engage or contact eggs for removal thereof from the egg flat using an egg grasp device 500. According to some aspects, the egg grasp device 500 may include a sheath 550. In some instances, the sheath 550 may extend from a body 502, wherein the body 502 acts as a base from which the sheath 500 projects. The sheath 550 may have a proximal end 552 at which the body 502 or other substrate is attached or engaged. The body 502 may be of unitary construction with the sheath 550, while in other instances the body 502 may be discrete from the sheath 550. The sheath 550 defines a cavity 556 in which the egg is retained such that the sheath 550 itself forms a pseudo protective shell about the egg.

The sheath 550 may be configured to capture an egg using physical contact and interaction such that the egg may be seized from the egg flat or other container or surface. In this regard, the sheath 550 may act in a suctionless or vacuumless manner for capturing eggs. The sheath 550 may be capable of deflecting, as shown in FIG. 6, about the egg as the sheath 550 advances or descends upon the egg such that the egg becomes seated or secured within the sheath 550. In some instances, the egg may be lifted using the egg grasp device 500 in which the egg is suspended in the sheath against gravity. In this regard, the sheath 550 should provide sufficient rigidity to prevent the egg from falling out of the sheath 550 under its own weight and/or when moved. The sheath 550 may define an opening 560 through which the egg is passed for seating within the sheath 550. A central axis 510 may be defined by the egg grasp device 500 lengthwise along its longitudinal axis. The opening 560 is defined about the central axis 510 and formed at a distal end 554 of the sheath 550. The opening 560 may be defined as any number of sizes and shapes. For example, the elongated members 525 may intersect to define a hexagonally-shaped opening 560, as shown in FIG. 4. In some instances, the circumference or dimensions of the opening 560 may be less than the circumference of the egg at its widest section (i.e. middle of the egg or midway between the ends). In some instances, the opening 560 may be substantially smaller than the circumference of the egg at the widest section of the egg when vertical.

In some instances, the sheath 550 may be formed of a plurality of elongated members 525 capable of deflecting about the egg for capturing the egg and retaining the egg within the sheath 550 without mechanical actuation of the elongated members 525. According to some aspects, the elongated members 525 may extend or project from the body 502. The elongated members 525 may be interlaced to form the sheath 550. In this regard, the term interlaced refers to the overlapping and/or interweaving of the elongated members 525 so as to form the sheath 550 capable of encompassing and retaining the egg. That is, the interlaced elongated members 525 cooperate to form an overlapping sleeve arrangement that encircles and surrounds the egg, as shown in FIG. 5. The interlaced elongated members 525 may have various sizes, arrangements, or structures that permit the sheath 550 to seize an egg using physical contact and engagement therewith as the means for capturing the egg. Regardless of the form the interlaced sheath 550 takes, the egg grasp device 500 may be capable of capturing the egg by means of physical contact and without suction. The elongated members 525 may extend from the body 502 at a variety of angles such as, for example, at about five degrees.

According to one aspect, as shown in FIGS. 2-5, the elongated members 525 may be loops extending from the body 502 to largely form a U-shape. In this aspect, each elongated member 525 may have a pair of leg segments 530 extending from the body 502 and connected by an arcuate segment 532. The loop elongated members 525 may be interlaced to form the sheath 550. The arcuate segments 532 may intersect to form the opening 560 at the distal end 554. The sheath 550 may have a length 565 sufficient for receiving eggs of varying size. For example, the length 565 may be about 2.75 inches (6.99 cm). As the distal end of the sheath 550 interacts with the egg, the arcuate segments 532 physically contact the egg and advance along the shell contours as the sheath 550 encapsulates the egg.

In some instances, each loop elongated member 525 may alternate going over/under the other loop elongated members 525 it intersects. For example, as shown in FIG. 4, elongated member 525a may go over elongated members 525c and 525e and under elongated members 525b and 525d; elongated member 525b may go over elongated members 525a and 525f and under elongated members 525c and 525e; elongated member 525c may go over elongated members 525b and 525d and under elongated members 525a and 525f; elongated member 525d may go over elongated members 525a and 525f and under elongated members 525c and 525e; elongated member 525e may go over elongated members 525b and 525d and under elongated members 525a and 525f; elongated member 525f may go over elongated members 525c and 525e and under elongated members 525b and 525d. In this regard, the interlaced elongated members 525 may be arranged to form an intricate crisscrossing pattern defining the opening 560, as viewed from the distal end 554. Since the elongated members 525 are interlaced, when the distal end 525 encounters a force (e.g., an egg) the elongated members 525 open up together, as sequentially illustrated FIG. 6. That is, when one elongated member 525 starts to deflect and open up, then the adjacent elongated member 525 opens as well, as similarly seen in nature with a flower (see FIG. 7), due to the interlacing. In this instance, the elongated members 525 are the so-called petals that are capable of deflecting outward (i.e., blooming) from the central axis 510.

According to some aspects, the elongated members 525 may be formed of a pliant, flexible or resilient material so as to allow the sheath 550 to deflect about the egg when coming into contact therewith. The elongated members 525 may be constructed from various materials that exhibit such deflective, elastic, or resilient qualities, such as, for example, resilient materials, elastic materials, super-elastic materials, pseudo-elastic materials, and shape memory materials. In some instances, the elongated members 525 may be constructed of a shape-memory material (e.g., shape memory alloy or shape memory polymer) that has the ability to return from a deformed state (temporary shape) to its original (permanent) shape. In some instances, the shape-memory material may return to its original shape when induced by an external stimulus such as temperature change. In other instances, the elongated members 525 may be constructed of a super-elastic alloy (e.g., nickel titanium (nitinol)) that when deformed returns to its pre-deformed shape without external stimulus. When mechanically loaded, a super-elastic alloy deforms reversibly to very high strains (up to 10%) by the creation of a stress-induced phase. When the load is removed, the new phase becomes unstable and the material regains its original shape. Such super-elastic materials, pseudo-elastic materials, and shape memory materials provide the benefit of resisting fatigue, an important factor when considering the substantial quantity of production eggs processed in hatchery and table egg industries. Examples of materials suitable for use in accordance with the present disclosure include, but are not limited to, nitinol, CuZnAl alloys, CuAlNi alloys, and CuAlBe alloys. Further, shape-memory polymers may be suitable for use, such as polyurethanes or block copolymers (e.g., polyethylene terephthalate (PET), polyethyleneoxide (PEO), etc.) in accordance with the present disclosure. In some instances, the elongated members 525 may be constructed of metal alloys (e.g., stainless steel) or polymer components, or combinations thereof. According to one particular aspect, the elongated members 525 may be constructed from a material having an elastic (Young's) modulus of about 7 Mpsi (48 GPa).

In some instances, the elongated members 525 may be in the form of resilient or flexible wire (metal or polymer strand) wherein the sheath 550 is formed of an interlaced pliant wire structure in which to seat or secure the egg. The interlaced wires deflect around the egg instead of breaking through the egg because the wires are thin enough that they bend and yield over the egg surface. The wire may be of any diameter that allows for the resilient and rigidity functions of the sheath 550. In this regard, the wire diameter may be chosen to allow deflection of the elongated members 525 about the egg for capturing the egg, while also providing sufficient rigidity such that the egg does not fall out of the sheath 550 under its own weight when seated therein. For example, the elongated members 525 may be six wires cooperating to form the sheath 550, with each wire having a diameter less than about 1.22 mm, and preferably a diameter between about 0.025 inches (0.635 mm) and 0.040 inches (1.02 mm), and more preferably a diameter of about 0.032 inches (0.813 mm).

Because the wire elongated members 525 are interlaced, the diameter of the wire may be less than that would be used for a non-interlaced configuration, thereby providing improved flexibility of the sheath 550 that allows for capturing eggs of various sizes and shapes and positioned in various orientations. In other words, the interlacing of the elongated members 525 provides an effect in which the egg may be retained within the sheath 550 when using smaller diameter wire than would be used for a non-interlaced configuration. The interlaced smaller diameter wire allows for more deflection of the sheath 550 and a more gentle interaction with the egg, resulting in reduced egg cracking, while still having sufficient rigidity to retain the egg during lifting and/or movement of the egg grasp device 500. In this regard, the number of interlacing wires and frequency may increase as the wire diameter becomes smaller and/or longer in order to maintain the gripping force needed to retain the egg within the sheath 550. For example, the configuration shown in FIG. 9 is illustrative of this concept in which more wires, as compared to that shown in FIGS. 2-5, with reduced diameter are used to form the sheath 550. In some instances, the thinner wires may be provided in an increased quantity and used to surround or contain an egg such that the wires are too weak to capture the egg but it allows for the egg to be isolated from neighboring eggs.

While certain specific aspects of the elongated members 525 have been described, it is noted that the present disclosure is not limited to such specifics. That is, the elongated members 525 may be constructed of any suitable material, where the combination of material selection and degree of interlacing may create the right combination of flexibility and gripping force. In this regard, the flexibility and gripping performance may be controlled by the number of interlacing elongated members 525 given the diameter of the wire in such instances. Further, the shape of the elongated members 525 is not limited to the U-shape shown in FIGS. 2-5. Instead, the elongated members 525 may be of any shape such as, for example, rectangular or straight wires that may be woven effectively to create the right combination of flexibility and gripping force to retain an egg. Additionally, the number of elongated members 525 and length thereof may increase or decrease based on the force required to grip an egg.

Initial engagement with an egg may be based on the natural elasticity or memory tension of the elongated members 525. In this regard, after initial engagement with the egg, the elongated members 525 hold the egg such that constant external mechanical tension is not required to retain the egg within the sheath 550. The elongated members 525 may be capable of bending elastically to accommodate eggs of varying size and shape, and positioned in various orientations, as shown in FIG. 8. In this regard, the sheath 550 may provide automatic and passive gripping means. The elongated members 525 may follow the contour of the egg to grip the egg as the elongated members 525 are advanced about the egg.

According to some aspects, the egg grasp device 500 may include an actuator capable of advancing the sheath 550 on the egg in order to capture the egg. The actuator may be a linear actuator such as, for example, a pneumatically controlled cylinder. In some instances, the egg may be fully or partially advanced within the sheath 550 while the sheath remains in a stationary position. In instances where the egg grasp devices 500 are selectively controlled, each actuator may be capable of receiving a signal indicating the egg classification status of respective eggs in the egg flat such that the actuators may be selectively actuated, thereby facilitating engagement or contact of certain select egg grasp devices 500 with respective eggs. By selectively actuating the actuators, interaction of components of the egg grasp device 500 with non-live or otherwise undesirable eggs may be advantageously avoided.

According to some aspects, the egg grasp device 500 may include a release device configured to release the egg from the sheath 550. In some instances, the release device may include a contact portion capable of contacting the egg to force the egg out of engagement with the sheath 550. In some instances, the sheath 550 may be constructed of shape-memory materials in which the release mechanism for releasing eggs may be accomplished by providing an electrical current or a temperature change to the sheath 550 such that the egg is released according to a memory release protocol.

In some instances, as shown in FIG. 8, an egg support assembly 700 may be provided for raising the eggs from the egg flat 30 such that the sheath 550 is capable of sufficiently advancing to fully seat the eggs therein, without obstruction from the egg flat 30. The egg flat 30 may typically be open-ended such that each egg receptacle 40 includes a hole through which the egg may be raised from underneath. In this regard, the eggs may be raised from underneath the egg flat by the egg support assembly 700, while the egg grasp devices 500 lift and remove the eggs from above the egg flat. That is, the egg support assembly 700 may operate and be positioned beneath the egg flat, while the egg grasp devices 500 operate and are positioned above the egg flats. In this manner, the egg support assembly 700 provides support to the eggs such that the sheath 550 may be advanced about the eggs for securing thereof. According to some aspects, the egg support assembly 700 may include a plurality of pedestals 710 for individually raising the eggs from each respective egg receptacle 40. In this manner, the eggs may be raised separately with respect to one another.

In operation, as shown in FIG. 8, an egg flat 30 containing eggs 1 may be conveyed to the removal position beneath the egg processing head 200. The egg grasp device 500 begins at a fully raised, retracted or ascended position. The egg grasp device 500 may then advance or descend to engage the egg 1 at which point the sheath 550 contacts the egg and begins to deflect. The sheath 550 may be further advanced to a fully descended position until the egg 1 is fully seated therein or secured thereto for removal. As the elongated members 525 engage the egg, the elongated members 525 begin deflecting and conforming to the surface contour of the egg. The egg grasp device 500 may then be raised, retracted or otherwise ascended so as to remove the egg 1 from the receptacle 40. Thereafter, the release device may be actuated to contact the egg 1, thereby pushing the egg 1 out of engagement with the sheath 550. The released egg 1 may then be transported or processed accordingly. As shown in FIG. 8, the interlaced configuration may advantageously provide the flexibility, as previously described, to capture eggs at tilted orientations where the longitudinal axis of the egg is angled with respect to the central axis 510 of the egg grasp device 500.

Once captured by the egg grasp device 500, the eggs may be carried thereby to various processing stations or modules, such as, for example, egg identification, egg removal, egg injection, egg sampling, egg holding, egg heating, egg cleaning or sanitizing, egg stacking, egg sorting, egg back-filling, egg arranging (according to egg flats), egg transfer, egg sealing, or any other egg processing.

Furthermore, the egg grasp device 500 may advantageously facilitate straightening of eggs when received therein. That is, eggs oriented off-axis within the egg flat may be straightened due to the forces exerted on the egg by the sheath 550 when engaging the egg. It may be desirable to straighten or vertically align eggs automatically using the egg lifting device 500 for further processing of such eggs. For example, the eggs may be returned to an egg flat for injection of the eggs with a treatment substance in which case it may be desirable to have the eggs vertically aligned along the longitudinal axis of the egg within the egg flat. Still, in other instances, it may be desirable to straighten eggs vertically without the need to capture the eggs. The disclosed sheath 550 may also facilitate such an orientating function, as desired. In such instances where it is not desirable to actually seize the egg within the sheath 550 for transport, the length 565 thereof may be decreased such that the elongated members 525 do not extend to such a distance along egg, with respect to the longitudinal axis thereof, to fully seat the egg, thereby allowing the egg to be straightened by the sheath 550 but not captured.

In addition to straightening, the sheath 550 may be used to surround an egg in order to isolate it from adjacent or neighboring eggs. Further, the sheath 550 may be used to clean surfaces of an egg since any large debris on the surface of the egg may be mechanically separated by the action of the elongated members 525 sweeping across the egg surface.

According to one aspect, as shown in FIG. 10, the egg grasp device 500 may include a shroud 600 at least partially covering the sheath 550. The shroud 600 may be a flexible material (e.g., latex or other stretchable fabric) capable of covering the sheath 550. The shroud 600 may effectively surround the egg for protecting the egg or neighboring eggs from a rotten egg exploding during an egg processing operation, such as, for example, mechanical handling. FIG. 10 illustrates a sequence in which an egg is captured by a sheath 550 having a shroud 600. The stretchable nature of the shroud 600 allows for the shroud 600 to expand as the sheath 550 expands to accommodate the egg captured therein.

According to other aspects of the present disclosure, as shown in FIG. 11, a plurality of egg grasp devices 500 may be implemented in an egg removal system 800 for removing eggs from an egg flat 30 or other egg carrier. The flexibility of the sheath 550 allows for capturing eggs at various angles with decreased risk of breaking shells. To that end, the egg grasp devices 500 may be mounted to a rotatable drum assembly 810 rotatably driven by a drive system in direction 805. As the egg grasp devices 500 are rotated, an egg 1 identified for removal comes into position via the conveyor assembly 112 proximate to one of the egg grasp devices 500, which is selectively actuated or deployed in a direction 815 to engage and capture the egg 1 identified for removal. Upon capture, the removed egg may be rotated to an ejection position in which the egg 1 is selectively ejected from the egg grasp device 500 into a discard receptacle 820.

Many modifications and other aspects of the present disclosure set forth herein will come to mind to one skilled in the art to which this disclosure pertains having the benefit of the teachings presented in the foregoing descriptions and the associated drawings. For example, the egg grasp device 500 may be adapted or modified to rotate so at to rotate the egg or otherwise orient at various angles with respect to vertical for achieving a desired purpose such as, for example, manipulating an air cell (air pocket) within the egg for injection or sampling purposes. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg grasp device, comprising:
   a body; and
   at least three elongated members extending from and fixed to the body and being interlaced to form a sheath capable of retaining an egg, each elongated member crossing multiple other elongated members, the sheath having a distal end and a proximal end at which the elongated members are operably engaged with the body, the elongated members cooperating to define an opening at the distal end through which an egg is received when the elongated members engage and deflect about an egg such that the egg is seated within the sheath.

2. An egg grasp device according to claim 1, wherein each elongated member is formed of a resilient material.

3. An egg grasp device according to claim 2, wherein each elongated member is formed of a flexible wire and loop shaped.

4. An egg grasp device according to claim 1, wherein each elongated member has a pair of leg segments extending from the body, and each elongated member further having an arcuate segment connecting the pair of leg segments.

5. An egg grasp device according to claim 4, wherein the arcuate segments cooperate to define the opening.

6. An egg grasp device according to claim 1, further comprising a release device configured to release the egg from the sheath.

7. An egg grasp device according to claim 1, further comprising a shroud at least partially covering the sheath.

8. A method of securing eggs, the method comprising:
   A descending an egg grasp device to interact with an egg, the egg grasp device having at least three elongated members fixed to a body and interlaced to form a sheath capable of retaining the egg, each elongated member crossing multiple other elongated members, the elongated members cooperating to define an opening through which the egg is received;
   contacting the sheath with the egg at the opening;
   seating the egg within the sheath by deflecting the elongated members about the egg; and
   ascending the egg grasp device.

9. A method according to claim 8, further comprising the step of releasing the egg from the sheath by actuating a release device.

10. A method according to claim 8, further comprising the step of raising the egg from beneath such that the egg is capable of being seated within the sheath.

11. An egg processing system, comprising:
    a head configured to ascend and descend; and
    a plurality of egg grasp devices operably engaged with the head, each egg grasp device having at least three elongated members fixed to a body and interlaced to form a sheath capable of retaining an egg, each elongated member crossing multiple other elongated members, the elongated members cooperating to define an opening through which the egg is received when the elongated members engage and deflect about an egg such that the egg is seated within the sheath.

* * * * *